United States Patent

[11] 3,628,798

[72] Inventor John F. Mehlhope
 Detroit, Mich.
[21] Appl. No. 823,039
[22] Filed May 8, 1969
[45] Patented Dec. 21, 1971
[73] Assignee M P Pumps, Inc.
 Detroit, Mich.

[54] RADIALLY COMPRESSED SHAFT SEALING DEVICE
 1 Claim, 5 Drawing Figs.

[52] U.S. Cl. ..................................... 277/34,
 277/35
[51] Int. Cl. ..................................... F16j 15/46
[50] Field of Search ........................... 277/34,
 230, 123, 12, 34.6, 51, 35

[56] References Cited
 UNITED STATES PATENTS

| | | | |
|---|---|---|---|
| 3,514,113 | 5/1970 | Weiswurm | 277/34 X |
| 2,825,589 | 3/1958 | Richardson et al. | 277/34 |
| 3,338,583 | 8/1967 | Isdale | 277/34.3 |
| 632,442 | 9/1899 | Byle et al. | 277/34 X |
| 1,772,210 | 8/1930 | Dale | 277/34 X |
| 2,351,343 | 6/1944 | Kelley | 277/34 X |
| 2,716,034 | 8/1955 | Main | 277/230 X |
| 2,817,544 | 12/1957 | Nuell | 277/123 |

FOREIGN PATENTS

| | | | |
|---|---|---|---|
| 111,991 | 3/1876 | France | 277/34 |
| 776,205 | 6/1957 | Great Britain | 277/34 |

Primary Examiner—Samuel B. Rothberg
Attorney—Barthel and Bugbee

ABSTRACT: This shaft seal is adapted to be installed in the shaft bore of the housing or frame of the machine, such as a pump, of which the shaft is to be sealed. In its simplest form (FIG. 1) it consists of an annular elastomeric diaphragm sleeve disposed coaxial with but spaced radially away from the shaft to be sealed and having its opposite ends bonded or otherwise secured to the bore wall with pressuretight connections, the annular compartment between the diaphragm sleeve and the shaft being occupied by a packing consisting of compressible packing rings or gaskets. The bore wall has ports which, in the case of a pump, communicate with the discharge side thereof to receive pressure fluid therefrom. In a second form (FIG. 2), the port is connected to a conduit leading to an external source of pressure fluid. In a third form (FIG. 3), the bore contains a hollow annular expansible member, such as an elastomeric bladder, connected by a conduit to an external source of pressure fluid. In a fourth form (FIG. 4), the diaphragm sleeve is secured at its opposite ends to the shaft bore by expansible snap rings engaging axially spaced annular grooves in the shaft bore wall. In a fifth form (FIG. 5), the diaphragm sleeve is bonded or otherwise secured at its opposite ends to the inside of the opposite ends of a flanged cylindrical cartridge whereby to constitute a replaceable shaft seal. In any of the five forms of the invention, the pressure fluid acting on the annular diaphragm sleeve (FIGS. 1, 2, 4 and 5) of on the inner wall of the bladder (FIG. 3) acting as a diaphragm sleeve produces a direct radial force which directly compresses the packing rings in a purely radial direction against the shaft without substantially compressing them in an axial direction.

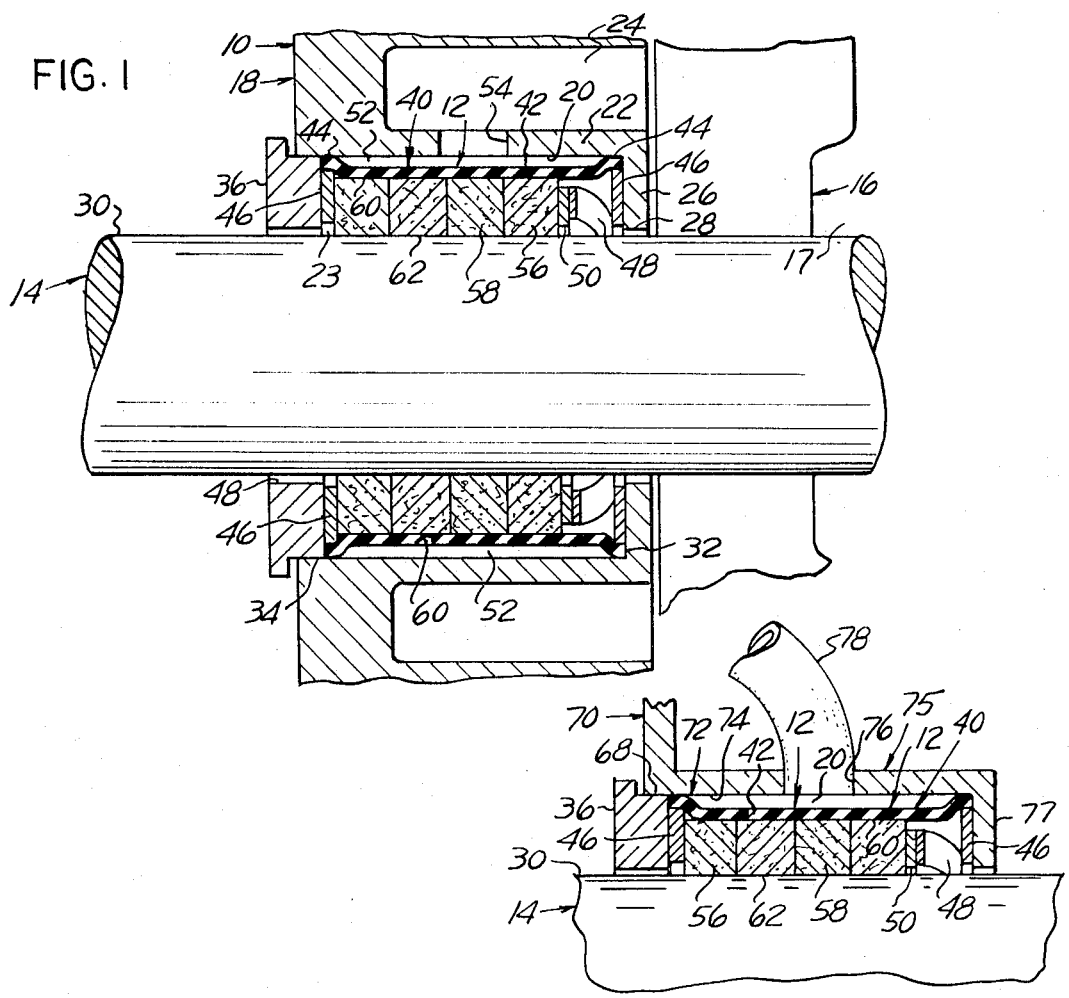
FIG. 1
FIG. 2
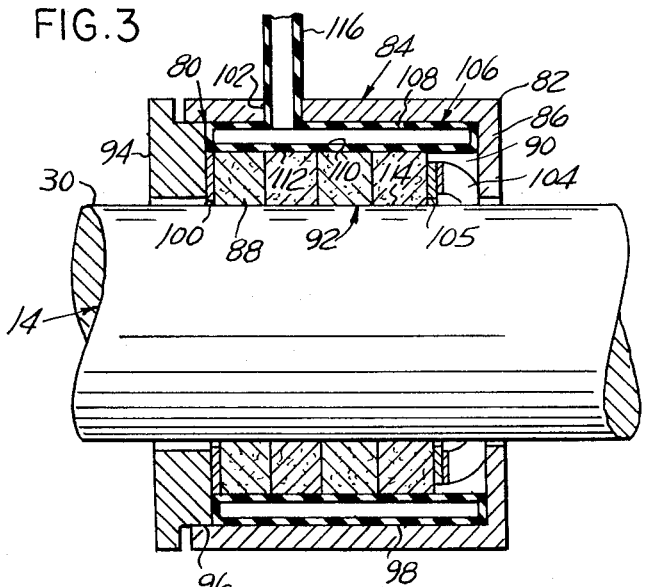
FIG. 3
INVENTOR
JOHN F. MEHLHOPE
BY Barthel & Bugbee
ATTORNEYS

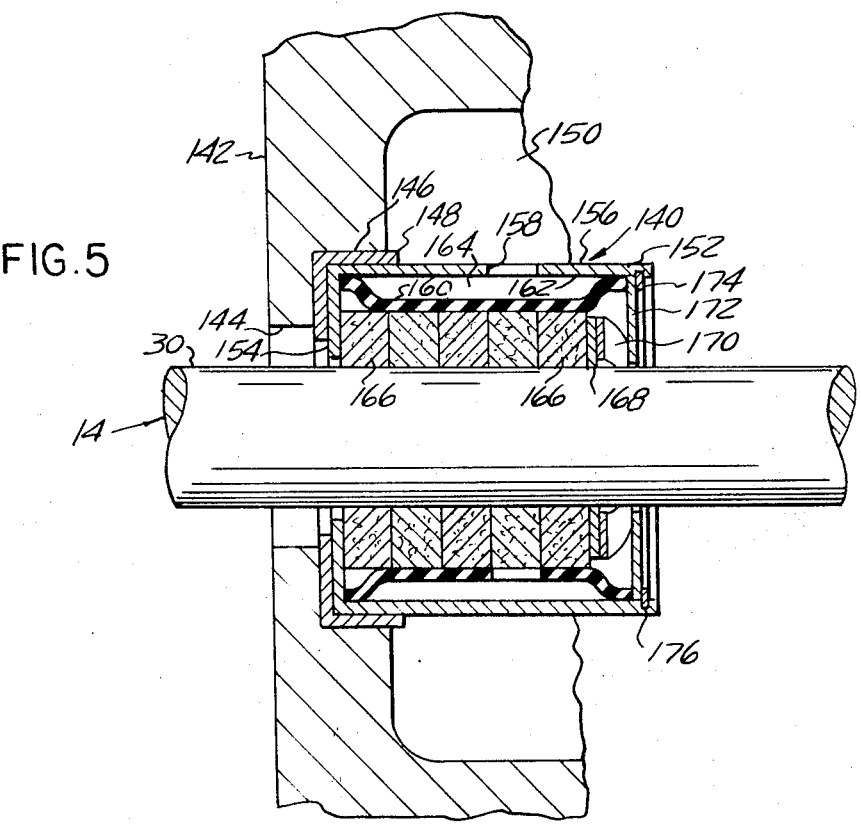
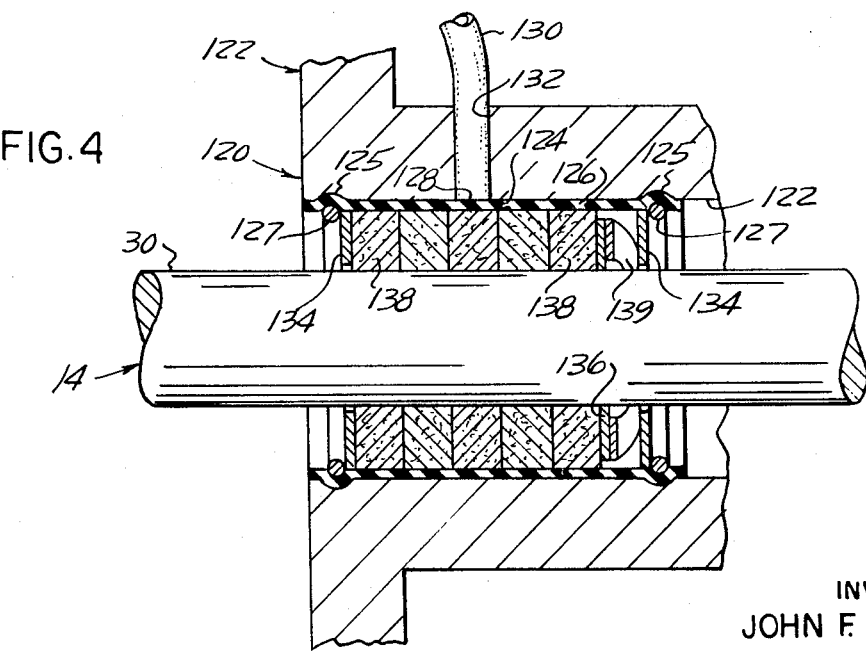

RADIALLY COMPRESSED SHAFT SEALING DEVICE

BACKGROUND OF THE INVENTION

Hitherto, shafts have been sealed by means of conventional stuffing boxes including packings consisting of annular gaskets which are compressed by annular glands moved axially against the packing, thereby producing axial and radial components of force. The radial components of force are produced as a result of the reaction of the compressible gaskets against the annular surrounding wall of the machine acting as an abutment preventing outward radial expansion and permitting only axial and inward radial compression of the gaskets. Since a large proportion of the axial force produced by the axial motion of the gland is absorbed in axial compression of the gaskets, only a fraction of the axial force exerted by the gland is converted into radial force for compressing the gaskets of the packing. As a result, prior shaft packings have been unsatisfactory by reason of requiring excessive axial force to be exerted by the ordinarily threaded gland in order to generate an adequate radial force component for sufficiently compressing the gaskets radially.

SUMMARY OF THE INVENTION

In contrast to the prior art shaft sealing devices employing axially movable glands to produce both axial and radial forces for compressing the gaskets of the packing both axially and radially, the present invention provides means for compressing the gaskets of the packing by the application of a direct radial force without the necessity of previously applying an axial force against the packing. The beneficial result of the present invention is that the shaft is adequately sealed against leakage of fluid therealong in an even manner without requiring the generation of excessive axial forces and without the production of the excessive wear previously caused by such forces.

In the drawings,

FIG. 1 is a fragmentary central vertical section through the central portion of a pump having an impeller shaft sealed by a first form of shaft seal having a diaphragm sleeve bonded to the shaft bore and actuated by fluid pressure produced by the impeller to compress the packing gaskets, according to the invention;

FIG. 2 is a fragmentary central vertical section similar to FIG. 1 but showing a second form of the invention wherein the shaft seal device is compressed by pressure fluid from an external source thereof, in a machine which is not necessarily a pump;

FIG. 3 is a central vertical section through a third form thereof wherein the packing is compressed radially by an annular bladder supplied with pressure fluid from an external source;

FIG. 4 is a fragmentary central vertical section through a fourth form thereof wherein the diaphragm sleeve of the shaft seal is secured within the shaft bore by expansible snap rings engaging axially spaced annular grooves in the shaft bore wall; and FIG. 5 is a fragmentary central vertical section through a fifth form thereof wherein the diaphragm sleeve is bonded or otherwise secured to the inside of a flanged cylindrical casing which, with the packing gaskets, constitutes a unitarily replaceable sealing cartridge.

Referring to the drawing in detail, FIG. 1 shows a machine, generally designated 10, here shown as a pump, provided with a radially compressed shaft seal device, generally designated 12 according to one form of the invention, encircling and sealing the shaft 14, to which a pump impeller 16 is keyed or otherwise drivingly secured within an impeller chamber 17. The shaft 14 and impeller 16 are mounted within a pump housing 18 having an annular seal housing wall 22 containing a shaft bore 20 coaxial with and spaced radially from the shaft 14 to define an annular seal-receiving compartment 23. An annular recess 24 around the wall leads thereto from the impeller chamber 17 of the housing 18. The seal housing wall 22 terminates at an annular radial abutment flange 26 having an annular inner edge surface 28 disposed in close proximity to the cylindrical outer surface 30 of the shaft 14. Mounted adjacent the flange 26 is an annular abutment washer 32. The outer end of the bore 20 is threaded as at 34 to receive a correspondingly threaded flanged retaining ring 36 which is employed mainly to retain the sealing device 12 in position and not, as in conventional packings or stuffing boxes as a gland to compress the packing itself.

The sealing device 12 consists of a hollow cylindrical diaphragm sleeve 40 having its opposite ends 42 bonded at 44 to the inner surface 20 of the housing wall 22. Mounted adjacent the retaining ring 36 and the flange 26 respectively are abutment washers 46. Engaging the inner abutment washer 46 adjacent the flange 26 is an annular undulatory spring 48 of "wave spring" which in turn engages an intermediate washer 50. The bore 20 in the seal housing portion 22 is of somewhat larger diameter than the diaphragm sleeve 40 so as to provide an annular fluid chamber 52 therebetween which constitutes the radially outermost portion of the seal-receiving compartment 33. Ports 54 extend through the wall 22 from the recess 24 to the fluid chamber 52 for the passage of pressure fluid therethrough. Mounted in tandem along the shaft 14 in engagement with the cylindrical surface 30 thereof are multiple packing rings or gaskets 56 enclosed snugly within the compartment 23 and preferably of compressible braided packing material. The stack of packing rings 56 collectively constitutes a packing 58.

In the operation of the shaft sealing device 12, the shaft 14 and the impeller 16 thereon are set in rotation by the driving motor (not shown), thereby generating in the impeller chamber 17 pressure fluid which flows through the recess 24 and the ports 54 into the annular fluid chamber 52 against the elastomeric diaphragm sleeve 40. This action bends or flexes the diaphragm sleeve 40 thereof radially inward against the outer surfaces 60 of the packing rings 56 and thereby radially compressing the packing rings 56 and causing their inner surfaces 62 to be moved radially into snug sealing engagement with the surface 30 of the shaft 14. As a consequence, the entire packing 58 is compressed directly in a radial direction without the necessity of generating the compressing force as a component of an axial force by rotating a threaded annular gland axially thereagainst, as hitherto done in conventional shaft packing. The leakage of pressure fluid from the impeller chamber 17 along the surface 30 of the shaft 14 is thereby effectively prevented, and a substantially even radial compressing force is exerted against the packing 58.

The modified shaft-sealing device, generally designated 72, shown in FIG. 2 employs the same sealing elements as are shown in FIG. 1, hence similar parts are designated with the same reference numerals. In FIG. 2, however, the machine 70 to be sealed is not confined to one which, like the pump 10 of FIG. 1, generates pressure fluid in its own operation. The retaining ring 36 is threaded into the threaded portion 68 of the bore 74 of a housing 75 containing a port 76 corresponding to the port 54 of FIG. 1. Accordingly, a pressure fluid supply pipe 78 is connected to the port 76 and leads to an external source of pressure fluid, such as to a hydraulic pump or air compressor, or to a pipeline containing fluid under pressure. The housing 75 has an annular end flange 77.

The operation of the modified shaft-sealing device 72 when installed in the modified machine 70 of FIG. 2 is similar to that described above in connection with FIG. 1, except that pressure fluid from the external source (not shown) flows through the pressure fluid supply pipe 78 and port 76 into the annular chamber 52 surrounding the diaphragm sleeve 40, bending or otherwise deforming it. This action in turn compresses the stacked multiple packing rings 56 of the packing 58 so as to force their inner surfaces 62 into snug sealing engagement with the surface 30 of the shaft 14.

The modified sealing device shown in FIG. 3, generally designated 80, is installed in a machine 82 to be sealed relatively to the shaft 14 thereof and has a housing 84 with an inner end flange 86 extending closely adjacent the surface 30 of the shaft 14. Multiple sealing rings or gaskets 88 stacked axially along the shaft 14 within the annular space 90 between the shaft 14 and the housing 84 collectively form a packing 92. An annular retaining ring or gland 94 is threaded into the threaded portion 96 of the bore 98 within the housing 84 and acts against an annular disc or washer 100 separating it from the nearest annular packing ring 88 and extending between the bore 98 and the outer surface 30 of the shaft 14. The housing 84 has a port 102 therein opening into the bore 98 surrounding the outer portion of the annular axially elongated chamber 90 encircling the packing 92. A wave spring 104 abuts the flange 86 at one end and a washer 105 at its other end which in turn engages the adjacent packing ring 88.

Mounted within the annular chamber 90 outside the packing 92 is a hollow inflatable bladder or envelope 106 with its outer wall 108 engaging the surface of the bore 98 and with its inner wall 110 serving as a diaphragm sleeve engaging the outer surfaces 112 of the packing rings 88 making up the packing 92. As before, the inner surfaces 114 of the packing rings 88 engage the surface 30 of the shaft 14. The opposite ends of the bladder or envelope 106 engage the flange 86 and annular retaining disc 100 respectively. A pressure fluid supply pipe 116 is connected to the outer wall 108 of the bladder or envelope 106 and leads to an external source of pressure fluid, such as to a hydraulic pump or air compressor.

In the operation of the modified sealing device 80 of FIG. 3, pressure fluid, such as hydraulic pressure fluid or compressed air, is supplied through the supply pipe 116 to the bladder or envelope 106, inflating it and, since its outer wall 108 is prevented from expanding outward by the housing 84, the inner wall or diaphragm sleeve portion 110 is forced radially inward against the outer surfaces 112 of the packing ring 108, compressing the latter and consequently forcing their inner surfaces 114 into sealing engagement with the shaft surface 30. At the same time, the bladder 108 is prevented from expanding endwise or axially by the end flange 86 of the housing 84 and the annular retaining disc 100 and retaining ring or gland 94. As a result, leakage along the shaft surface 30 is effectively prevented.

The further modified shaft-sealing device, generally designated 120 for the machine 122 shown in FIG. 4, is generally similar to the sealing device 72 of FIG. 2, but is installed directly in the shaft bore 124. The bore 124, instead of being threaded to receive a retaining ring or gland, is provided with a pair of internal grooves 125 near its opposite ends. The elastomeric diaphragm sleeve 126 is inserted within the bore 124 and held in position by expansible resilient snap rings 127 which seal the space between the grooves 125 forming the chamber 128 when pressure fluid is supplied thereto through the pipe 130 inserted in the port 132. Retaining washers 134 at opposite ends of the diaphragm sleeve 126 adjacent the snap rings 127 hold in assembly packing rings 138 which are similar to the packing rings 56. Additional washer 136 of smaller diameter than the washers 134 is engaged by a wave spring 139 similar to the wave spring 48 of FIGS. 1, 2 and 3.

The operation of the modified shaft sealing device 120 of FIG. 4 is similar to that of the sealing device 72 of FIG. 2, hence requires no additional description.

The still further modified shaft sealing device, generally designated 140, shown in FIG. 5 is also similar in principle to the shaft-sealing device 12 of FIG. 1 but possesses the additional advantage of being a "cartridge" insertable and removable as a "package unit." It also does not require the retaining ring 36 nor the threaded shaft bore of FIG. 1. Instead, the pump housing 142 in which the sealing device 140 is inserted has a shaft bore 144 and counterbore 146, the latter receiving a flanged seat ring or seat cup 148 which is inserted from the internal chamber 150 of the pump 142. The sealing cartridge 140 has a flanged cylindrical casing 152 seated within the seat cup 148 which its end flange 154 abuts. The cylindrical portion 156 of the casing 152 is provided with a plurality of ports 158 for the admission of pressure fluid from the pump chamber 150 as a result of the action of the pump impeller 16 on the shaft 14 in a manner similar to that of the impeller 16 of FIG. 1. The elastomeric diaphragm sleeve 160 has its opposite ends bonded or otherwise tightly secured to the inner surface 162 of the cylindrical portion 156 of the casing 152 so as to form an expansion chamber 164. As before, packing rings 166 are mounted within the casing 152 in encircling relationship to the shaft 14 to be sealed. The innermost packing ring 166 abuts the casing flange 154 whereas the outermost packing ring 166 is engaged by a washer 168 which in turn is engaged by a wave spring 170 abutting a washer 172 held in place by a snapring 174 in a groove 176 near the end of the casing 152.

The operation of the still further modified sealing device 140 is also similar to that of the sealing device 12 of FIG. 1 and hence requires no further description. Its advantage, however, lies in the fact that it is easily inserted and removed as a "package unit" and kept in stock as such.

While this invention has been described and illustrated as regards its use as applied to the sealing of rotary shafts, it will also be evident to those skilled in this art that it is equally applicable to the sealing of reciprocating shafts. Furthermore, it will also be evident that the pressure fluid for operating the sealing devices of the present invention may be generated in any suitable manner, not necessarily by the rotating propeller of a pump, but, for example, but the piston of a reciprocating pump. To replace a worn sealing cartridge 140 with a fresh cartridge, the operator removes the impeller 16 from the shaft 14 by sliding these elements axially relatively to one another, this being possible by the key and keyway by which such mechanical elements are commonly drivingly but removably secured to one another in the mechanical arts. Upon removal of the shaft 14 and impeller 16, the sealing cartridge 140 may then be extracted from its position within the seat cup 148 by pulling the sealing cartridge 140 in an axial direction.

I claim:

1. A self-contained pressure fluid-actuated shaft-sealing cartridge adapted to be unitarily installed in and unitarily removed from the shaft bore of a pump having a housing containing a pressure chamber and a movable member therein adapted to generate pressure fluid within said chamber, said cartridge comprising —an elongated annular cup-shaped cylindrical casing having an annular end wall at one end and having an open opposite end,
   —an elongated annular elastomeric diaphragm sleeve mounted within said casing and defining therewith an elongated annular sleeve-expansion chamber,
   —means for securing the opposite end portions of the sleeve to the opposite end portions of said casing in fluidtight engagement therewith,
   —an elongated annular sealing packing including multiple packing portions of compressible packing material disposed in axially abutting relationship with one another inside said sleeve in peripheral engagement with said sleeve and adapted to be disposed in encircling sealing relationship to the shaft,
   —an annular closure member permanently secured in said open end of said casing,
   —and means comprising a fluid passageway in said casing connecting the pressure chamber to said sleeve-expansion chamber and transmitting pressure fluid into said sleeve-expansion chamber between said casing and said sleeve for urging said sleeve radially inward into simultaneous compressing engagement with all of said packing portions whereby to urge all of said packing portions radially at substantially equal pressures into simultaneous sealing engagement with the shaft.

* * * * *